(12) United States Patent
Meijer et al.

(10) Patent No.: US 9,784,316 B2
(45) Date of Patent: Oct. 10, 2017

(54) PROCESS FOR PREPARING A PROTECTIVE LAYER ON A TRIBOLOGICAL SURFACE OF A MECHANICAL COMPONENT

(71) Applicant: AKTIEBOLAGET SKF, Göteborg (SE)

(72) Inventors: Dick Meijer, Wageningen (NL); Dries Muller, Nijmegen (NL); Martines Maria Josef Noordman, Erichem (NL); John F. van de Sanden, Nieuwegein (NL)

(73) Assignee: AKTIEBOLAGET SKF, Gothenborg (SE)

( * ) Notice: Subject to any disclaimer, the term of this patent is extended or adjusted under 35 U.S.C. 154(b) by 540 days.

(21) Appl. No.: 14/365,560

(22) PCT Filed: Nov. 30, 2012

(86) PCT No.: PCT/EP2012/074134
§ 371 (c)(1),
(2) Date: Jun. 13, 2014

(87) PCT Pub. No.: WO2013/087429
PCT Pub. Date: Jun. 20, 2013

(65) Prior Publication Data
US 2015/0024129 A1    Jan. 22, 2015

(30) Foreign Application Priority Data
Dec. 13, 2011  (WO) ................ PCT/EP2011/072663

(51) Int. Cl.
*F16C 33/64*  (2006.01)
*C23C 24/06*  (2006.01)
*C23C 26/00*  (2006.01)

(52) U.S. Cl.
CPC .............. *F16C 33/64* (2013.01); *C23C 24/06* (2013.01); *C23C 26/00* (2013.01); *F16C 2223/80* (2013.01)

(58) Field of Classification Search
CPC ............................ C23C 24/06; F16C 2223/80
See application file for complete search history.

(56) References Cited

U.S. PATENT DOCUMENTS

| | | | | |
|---|---|---|---|---|
| 2,969,264 | A * | 1/1961 | Lamson | F16C 33/6696 384/463 |
| 3,186,945 | A | 6/1965 | Graue et al. | |
| 2002/0106978 | A1 | 8/2002 | Michaud et al. | |
| 2002/0183209 | A1 | 12/2002 | Jee et al. | |
| 2009/0159851 | A1* | 6/2009 | Meijer | C08L 91/06 252/382 |
| 2010/0021097 | A1* | 1/2010 | Uchida | B65G 39/09 384/492 |
| 2010/0183972 | A1* | 7/2010 | Hasegawa | C10M 103/00 430/119.7 |
| 2010/0211158 | A1 | 8/2010 | Haverty et al. | |

FOREIGN PATENT DOCUMENTS

| | | |
|---|---|---|
| JP | 3271378 B2 | 4/2002 |
| WO | 2009071674 A2 | 6/2009 |

* cited by examiner

*Primary Examiner* — Xiao Zhao
(74) *Attorney, Agent, or Firm* — Bryan Peckjian; SKF USA Inc. Patent Dept.

(57) ABSTRACT

The invention provides a process for preparing a protective layer on a tribological surface of a mechanical component, wherein the layer comprises a metal phosphate and/or metal sulphate having anti-wear and/or anti-fretting properties, and the process comprises subjecting the tribological surface of the component to a mechanical treatment which is carried out with a tool that moves at or along the tribological surface during which treatment the metal phosphate and/or metal sulphate in solid form is provided and the layer is formed on the surface of the mechanical component by means of deposition of the metal phosphate and/or metal sulphate compound.

18 Claims, No Drawings

PROCESS FOR PREPARING A PROTECTIVE LAYER ON A TRIBOLOGICAL SURFACE OF A MECHANICAL COMPONENT

CROSS-REFERENCE TO RELATED APPLICATIONS

This application is the US national stage of International Application No. PCT/EP2012/074134 filed on Nov. 30, 2012, which claims priority to International Patent Application No. PCT/EP2011/072663 filed Dec. 13, 2011.

FIELD OF THE INVENTION

The present invention relates to a process for preparing a protective layer on a tribological surface of a mechanical component. The process is particularly suitable for preparing a protective layer on a tribological surface of a rolling element bearing.

BACKGROUND

A bearing is a device that permits constrained relative motion between two components. Bearings may be used in many different types of machinery to retain and support rotating components such as, for example, a wheel on a vehicle, a vane on a windmill or a drum in a washing machine. A rolling element bearing comprises inner and outer rings and a plurality of rolling elements (balls or rollers). As the bearing rotates, the raceways of the inner ring and outer ring make contact with the rolling elements. This results in a wear path on both the rolling elements and the raceways. For a variety of reasons it sometimes happens that a bearing does not attain its calculated rating life. Rolling fatigue can, for instance, occur as a result of wear and fretting.

The minimization of wear and fretting is therefore important to extend the fatigue life of bearings. One way of extending the fatigue life of a bearing is to apply lubrication which, by means of an oil film, reduces the friction and wear in the contact areas of the respective bearing components.

It is further known to try to reduce wear by using, for example, a hard coating. However, these hard coatings have tended to be ceramic, which are brittle in nature and therefore subject to cracking and breaking up, thereby forming debris. This debris in turn results in an increase in wear. Therefore, these coatings, instead of alleviating the effects of wear and fretting, can actually increase the wear and fretting under some circumstances.

Currently, the most successful approach to countering the effects of fretting and wear on bearings is to use a lubricating oil, grease or paste which includes one or more additives with anti-wear and/or anti-fretting properties to reduce the friction between bearing components. Over time the additives form a layer that prevents metal-to-metal contact between the rolling elements and the raceway. A disadvantage of these additives is that a chemically active compound is needed, to provide a certain acidity for a chemical reaction. The chemical reaction takes place between the metal matrix and the active compound, which deteriorates the metal matrix. Further disadvantages of such applications are the facts that the layer is not present from the start of the use of the bearing and that formation of the layer only occurs when a particular temperature has been reached.

In JP 3271378 the formation of a protective layer on the surface of a sliding member or rolling member in the dynamic state has been described. The layer is formed by means of a tribochemical reaction in which reaction a chemically active compound such as an organic sulphur compound, organic phosphorus compound or an organic chlorine compound is used. The use of such compounds means that the contact surfaces are chemically attacked which may result in corrosion, fretting and wear problems.

Further, in WO 2009/071674 A2, the curved surface of a low-friction mechanical element is covered with a layer of tungsten disulphide by way of a tribochemical deposition process during which process the tungsten disulphide is formed as a result of the chemical reaction between a tool having a tungsten-carbide surface and a process fluid that contains sulphur.

SUMMARY OF THE INVENTION

The present invention aims to provide a new approach to combat the effects of wear and fretting between components of a bearing, and which deals with the disadvantages discussed above. In particular, the present invention provides a mechanical component for use in bearing applications, wherein a tribological surface of the mechanical component is provided with a protective layer of a metal phosphate and/or metal sulphate having anti-wear and/or anti-fretting properties, which metal phosphate and/or metal sulphate is physically deposited onto the tribological surface of the mechanical component. Hence, the protective layer is already present before operating the bearing, resulting in an improved fatigue life of the bearing. Moreover, the use of present protective layer also allows the use of lubricating oils in which no anti-wear and anti-fretting additives, or a reduced amount of such additives, are present, making the use of the bearing more cost-effective.

Accordingly, the present invention relates to a process for preparing a protective layer on a tribological surface of a mechanical component, wherein the layer comprises a metal phosphate and/or metal sulphate having anti-wear and/or anti-fretting properties, and the process comprises subjecting the surface of the component to a mechanical treatment which is carried out with a tool that moves at or along the tribological surface during which treatment the metal phosphate and/or metal sulphate is provided in solid form, and the layer is formed on the tribological surface of the mechanical component by means of physical deposition of the metal phosphate and/or metal sulphate.

DETAILED DESCRIPTION OF THE INVENTION

In accordance with the present invention a metal phosphate and/or metal sulphate is used. Preferably, only a metal phosphate is used. Preferably, the metal to be used in the present invention is selected from the group consisting of calcium, zinc, antimony, lead, bismuth and barium. Most preferably, the metal phosphate comprises calcium phosphate.

The metal phosphate and/or metal sulphate to be used in accordance with the present invention is in solid form, e.g. in powder form or paste form. When the metal phosphate and/or metal sulphate is used in the form of a paste, a small amount of a lubricating oil or a grease can be present. Suitably, the lubricating oil or grease is present in an amount of less than 5 wt. %, preferably less than 2 wt %, and most preferably less than 1 wt %, based on total weight of the paste. As the lubricating oil or grease, any lubricating oil or grease known per se may be used.

Preferably, the metal phosphate and/or metal sulphate in solid form is provided in the form of a powder. Suitably, the metal phosphate and/or metal sulphate may be pressed into a block together with a solid carrier material such as a ceramic material. Preferably, such a block comprises at least 50 wt % of the metal phosphate and/or metal sulphate, more preferably 70-80 wt % of the metal phosphate and/or metal sulphate, based on total weight of the block.

In the process of the present invention the mechanical treatment is carried out at a temperature in the range of from 20-150° C., preferably in the range of from 40-120° C. The mechanical treatment can suitably be carried out for a period of time in the range of from 1 second to 10 minutes, preferably a period of time in the range of from 1 second 2 minutes. The mechanical treatment is suitably carried out at a pressure in the range of from 0.01-2 GPa, preferably at a pressure of 0.01-1 GPa.

The protective layer to be prepared with the process in accordance with the present invention has suitably a thickness in the range of from 1 nanometer to 2 μm, preferably 1 nanometer to 1 μm.

In accordance with the present invention the protective layer is formed on the tribological surface of the mechanical component by means of physical deposition of the metal phosphate and/or metal sulphate. The present process is therefore a non-chemical deposition process.

In accordance with the present invention a wide variety of mechanical components can be used. Preferably, the mechanical component comprises a bearing component, a gear box component, a shaft or a machine bed. More preferably, the mechanical component comprises a bearing inner or outer ring, whereby the protective layer is provided on the raceway of the bearing ring. Preferably, in accordance with the invention, prior to the mechanical treatment, the mechanical component is subjected to one or more finishing techniques selected from the group consisting of grinding and honing, hard turning, ECM (electro chemical machining), calendaring, burnishing, vibrofinishing and laser treatment.

The mechanical treatment in the process according to the present invention is carried out with a tool that moves at or along the tribological surface. Preferably, the mechanical treatment is carried out by means of a hone-like process. Hence, the tool to be used in the mechanical treatment is suitably a honing tool. The honing tool can be any honing tool known in the art. Suitably, the honing tool may comprise a carrier with a similar geometry to a hone stone. The carrier may be a regular hone stone, whereby the outer surface is provided with a layer of metal phosphate and/or metal sulphate paste. Alternatively, the carrier may be formed from a block of metal phosphate and/or metal sulphate powder that has been pressed together with a ceramic material, as described above. The carrier may be the honing tool or form part of the honing tool.

During the process, the carrier pressed onto, for example, the raceway of a bearing inner ring, while the ring is rotated. Preferably, the raceway of the bearing outer ring is also subjected to the process of the invention, such that when the bearing is assembled, it is able to withstand high loads on start-up, without risk of wear. Thus, in accordance with the present invention, "finished" mechanical components can be produced which are ready for operation and which show excellent anti-wear and/or anti-fretting properties from the very beginning of their use.

The invention claimed is:

1. A process for preparing a protective layer on a tribological surface of a bearing ring, the layer comprising a metal phosphate and/or metal sulphate having anti-wear and/or anti-fretting properties, the process comprising: subjecting the tribological surface of the bearing ring to a mechanical treatment with a tool that moves at or along the tribological surface, the metal phosphate and/or metal sulphate being disposed in solid form on the tool, and wherein the layer is formed on the tribological surface of the bearing ring by physical deposition of the metal phosphate and/or metal sulphate.

2. The process according to claim 1, wherein the metal is selected from the group consisting of calcium, zinc, antimony, lead, bismuth and barium.

3. The process according to claim 1, wherein the metal phosphate is calcium phosphate.

4. The process according to claim 1, wherein the metal phosphate and/or metal sulphate is provided in the form of a powder or a paste.

5. The process according to claim 4, wherein the metal phosphate and/or metal sulphate is provided in the form of a powder.

6. The process according to claim 1, wherein the mechanical treatment is carried out at a temperature in the range of from 20-150° C.

7. The process according to claim 1, wherein the mechanical treatment is carried out for a period of time in the range of from 1 second to 10 minutes.

8. The process according to claim 1, wherein the mechanical treatment is carried out at a pressure in the range of from 0.01-2 GPa.

9. The process according to claim 1, wherein the protective layer has a thickness in the range of from 1 nanometer to 2 μm.

10. The process according to claim 1, wherein prior to the mechanical treatment, the bearing ring has been subjected to one or more finishing techniques selected from the group consisting of grinding and honing, hard turning, ECM (electro chemical machining), calendaring, burnishing, vibrofinishing and laser treatment.

11. The process according to claim 10, wherein the mechanical treatment is carried out by a honing tool.

12. The process according to claim 10, wherein a carrier impregnated with the metal phosphate and/or metal sulphate or which is provided with a layer of the metal phosphate and/or metal sulphate is used to treat the tribological surface.

13. The process according to claim 1, wherein the mechanical treatment is carried out at a temperature in the range of from 40-120° C.

14. The process according to claim 1, wherein the mechanical treatment is carried out for a period of time in the range of from 1 second to 2 minutes.

15. The process according to claim 1, wherein the mechanical treatment is carried out at a pressure in the range of from 0.01-1 GPa.

16. The process according to claim 1, wherein the protective layer has a thickness in the range of from 1 nanometer to 1 μm.

17. The process according to claim 1, wherein subjecting the tribological surface to the mechanical treatment comprises pressing the tool against the tribological surface while rotating the bearing ring.

18. The process according to claim 1, wherein the tribological surface is a raceway of the bearing ring.

* * * * *